(12) United States Patent
Suzuki

(10) Patent No.: US 8,824,026 B2
(45) Date of Patent: Sep. 2, 2014

(54) IMAGE READING APPARATUS AND IMAGE READING HEAD

(75) Inventor: Nobuhiko Suzuki, Nagoya (JP)

(73) Assignee: Brother Kogyo Kabushiki Kaisha, Nagoya-shi Aichi-ken (JP)

( * ) Notice: Subject to any disclaimer, the term of this patent is extended or adjusted under 35 U.S.C. 154(b) by 1140 days.

(21) Appl. No.: 12/624,870

(22) Filed: Nov. 24, 2009

(65) Prior Publication Data
US 2010/0134853 A1 Jun. 3, 2010

(30) Foreign Application Priority Data

Nov. 28, 2008 (JP) .................................. 2008-304808

(51) Int. Cl.
*H04N 1/04* (2006.01)
(52) U.S. Cl.
USPC ........... 358/497; 358/475; 358/483; 358/482; 358/486; 250/208.1
(58) Field of Classification Search
USPC ......... 358/483, 512–514, 463, 475, 509, 505, 358/497, 474, 482, 486; 250/208.1, 250/234–236, 216, 239; 382/312, 318, 319
See application file for complete search history.

(56) References Cited

U.S. PATENT DOCUMENTS

| | | | |
|---|---|---|---|
| 4,723,120 A | 2/1988 | Petty, Jr. | |
| 5,568,281 A * | 10/1996 | Kochis et al. | 358/475 |
| 6,115,187 A * | 9/2000 | Tabata et al. | 359/654 |
| 7,375,863 B2 * | 5/2008 | Chen et al. | 358/474 |
| 7,558,524 B2 * | 7/2009 | Ooshima et al. | 399/370 |
| 8,014,044 B2 * | 9/2011 | Shiga et al. | 358/488 |
| 8,134,753 B2 * | 3/2012 | Ishido et al. | 358/449 |
| 2004/0233478 A1 * | 11/2004 | Ishido et al. | 358/449 |
| 2005/0029352 A1 | 2/2005 | Spears | |
| 2005/0052681 A1 * | 3/2005 | Kogi | 358/1.14 |
| 2007/0285739 A1 | 12/2007 | Nakano et al. | |

FOREIGN PATENT DOCUMENTS

| | | |
|---|---|---|
| JP | A-59-37764 | 3/1984 |
| JP | A-62-171250 | 7/1987 |
| JP | A-4-21153 | 1/1992 |
| JP | 10-154221 A | 6/1998 |
| JP | A-10-285339 | 10/1998 |
| JP | 2001-103250 | 4/2001 |

(Continued)

OTHER PUBLICATIONS

Japanese Office Action dated Dec. 14, 2010 together with partial English translation.

(Continued)

*Primary Examiner* — Cheukfan Lee
(74) *Attorney, Agent, or Firm* — Scully, Scott, Murphy & Presser PC

(57) ABSTRACT

An image reading apparatus having light emitting unit for irradiating light onto a original, reflected light detector light reflected by the original after the original is irradiated by the light emitting unit, outside light detector disposed in an area outside the area in which light reflected by the original enters the reflected light detector and reflected light correcting unit for correcting detection result data detected the reflected light detector based on outside light detected by the outside light detector. An image reading head having light emitting unit, which irradiates, a original with light, and a plurality of light receiving elements arranged in a row having a length longer than a length of the light emitting unit.

12 Claims, 17 Drawing Sheets

(56) References Cited

FOREIGN PATENT DOCUMENTS

| | | |
|---|---|---|
| JP | 2002-185796 | 6/2002 |
| JP | A-2002-271589 | 9/2002 |
| JP | 2005-65276 A | 3/2005 |
| JP | 2005072696 A * | 3/2005 |
| JP | A-2005-184720 | 7/2005 |
| JP | 2007-67861 A | 3/2007 |
| JP | A-2007-110655 | 4/2007 |
| JP | 2007-306486 A | 11/2007 |
| JP | A-2009-94935 | 4/2009 |
| WO | WO 2008/013234 A1 | 1/2008 |

OTHER PUBLICATIONS

Notification of Reasons for Refusal dated Jan. 31, 2012 received from the Japanese Patent Office from related Japanese Application No. 2008-304808, together with an English-language translation.

Official Action dated Jul. 5, 2011 received from the Japanese Patent Office from related Japanese Application No. 2008-304808, together with an English-language translation.

* cited by examiner

IMAGE READING APPARATUS AND IMAGE READING HEAD

CROSS REFERENCE TO RELATED APPLICATION

The present application claims priority from Japanese Patent Application No. 2008-304808 filed on Nov. 28, 2008, the disclosure of which is incorporated herein by reference in its entirety.

BACKGROUND OF THE INVENTION

The present invention relates to an image reading apparatus for reading an image of a original placed on a transparent original placement surface, and an image reading head which is moved in a sub-scanning direction along the back side surface of a transparent original placement surface on which a original is placed and which detects light reflected from the original, and more particularly to an image reading apparatus capable of correcting for an influence of outside light, and an image reading head capable of being applied to the image reading apparatus.

An image reading apparatus for reading an image of a original by irradiating a original placed on a original placement surface with light from light emitting unit and sequentially detecting reflected light reflected by the original with respect to a plurality of scanning lines has been contemplated conventionally. In this type of image reading apparatus, when light from the outside of the image reading apparatus (the so-called outside light) enters the periphery of a original, the detection result of the reflected light is affected. Therefore, an related art proposes to provide a light amount detection sensor in the vicinity of a original placement surface and select luminance/density conversion table data according to an outside light level detected by the light amount detection sensor and correct the detection result of the reflected light based on the selected luminance/density conversion table data.

SUMMARY OF THE INVENTION

Known image reading apparatus detects outside light level by using single light amount detection sensor fixed in the vicinity of a original placement surface. Conversely, there are cases where the outside light level varies according to a position of a sub-scanning direction of the original placement surface due to the presence of a shadow or illumination of the environment. In such a case, a detection result of the reflected light cannot be corrected well when the outside light level is detected at a single point.

An object of embodiments of the invention is to provide an image reading apparatus capable of correcting a detection result of reflected light from a original according to a change in an outside light level of a sub-scanning direction, and an image reading head capable of being applied to in the image reading apparatus.

To solve the above object, embodiments of the present invention provide an image reading apparatus comprising:
 a original placement surface onto which a original is to be placed;
 a light emitting unit which irradiates the original placed on the original placement surface with light;
 a reflected light detector comprising a plurality of light receiving elements arranged along a main scanning direction and which sequentially detect, along a plurality of scanning directions parallel to the main scanning direction, light reflected by the original after the original is irradiated by the light emitting unit;
 an outside light detector comprising a light receiving element arranged in at least one of a row the same as a row of the plurality of light receiving elements of the reflected light detector and a row substantially adjacent to the row of the plurality of light receiving elements of the reflected light detector, wherein the outside light detector is disposed in an area outside the area in which light reflected by the original enters the reflected light detector; and
 a reflected light correcting unit which corrects detection result data regarding the reflected light detected by the reflected light detector based on detection result data detected by the outside light detector.

The embodiments of the invention further provide an image reading head moved in a sub-scanning direction along a back side surface of a transparent original placement surface onto which a original is to be placed, the head comprising:
 a light emitting unit, which is arranged along a main scanning direction orthogonal to the sub-scanning direction and which irradiates, from the back surface of the original placement surface, a original placed on the original placement surface with light; and
 a plurality of light receiving elements arranged in a row along the main scanning direction, the row having a length longer than a length of the light emitting unit.

The embodiments of the invention further provide an image reading apparatus comprising:
 a original placement surface onto which a original is to be placed;
 a reading unit including:
  a light emitting unit which includes a plurality of light emitting elements arranged in a main scanning direction, and
  a light receiving unit which has a length in the main scanning direction longer than that of the light emitting unit and which includes a plurality of first light receiving elements which are arranged along the main scanning direction and are arranged adjacent to the plurality of light emitting elements and at least one second light receiving element which is arranged in alignment with the first light receiving elements and is not arranged adjacent to the plurality of light emitting elements; and
 a correcting unit which corrects outputs of the first light receiving elements based on an output of the second light receiving element.

DETAILED DESCRIPTION OF EXEMPLARY EMBODIMENTS

Figure 1A:
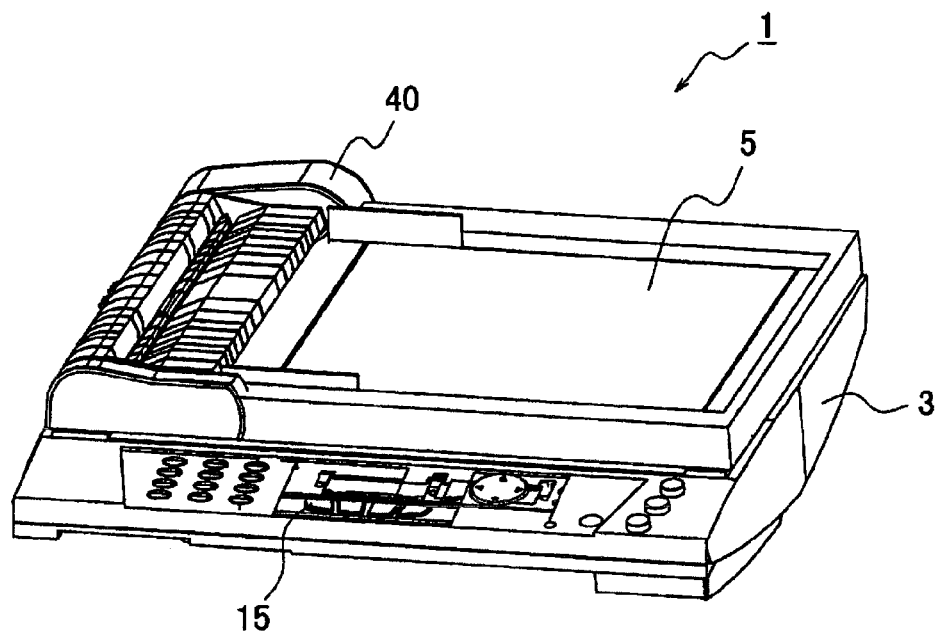
FIGS. 1A and 1B are external appearance views of an exemplary embodiment of an image reading apparatus according to the present invention.

Embodiments of the present invention will hereinafter be described with reference to the attached drawings.

An image reading apparatus 1 of the present embodiment is constructed as a so-called flatbed type scanner apparatus of the so-called flatbed type, and is made of an apparatus body 3 comprising a first reading surface 11 (one example of an original placement surface) and a second reading surface 12 in the upper portion, and a cover 5 (one example of a cover) disposed openably and closably over the apparatus body 3.

Figure 1B:
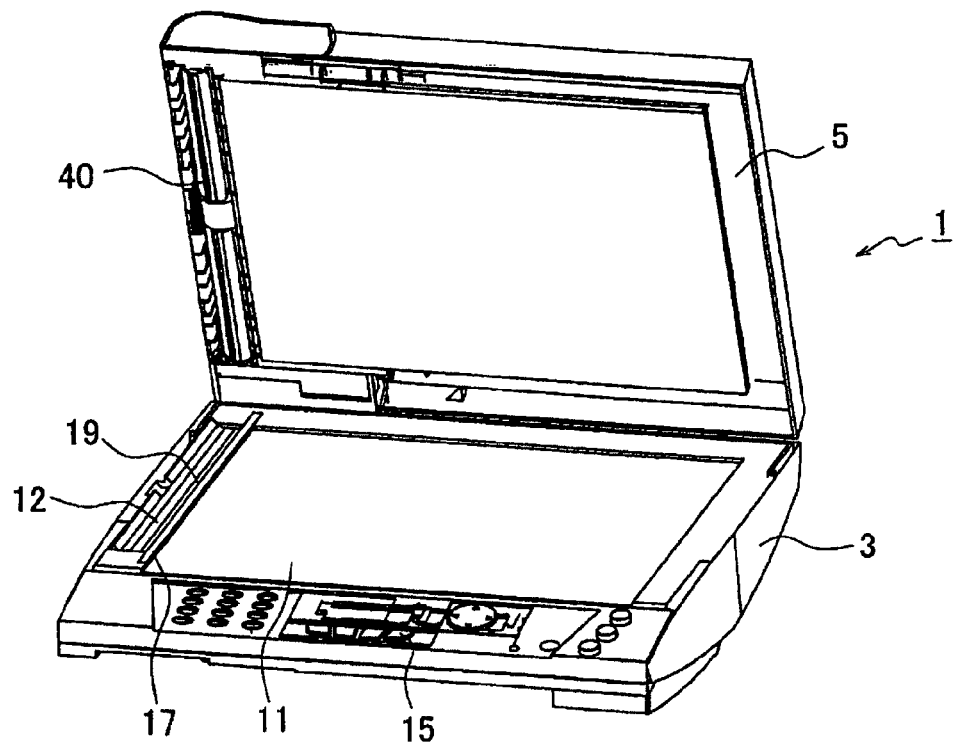

An upper surface of the apparatus body 3 is covered with the cover 5 in a state of closing the cover 5 as shown in FIG. 1A. Additionally, FIG. 1A is an external appearance view representing a configuration of the image reading apparatus 1 in a state of closing the cover 5 and FIG. 1B is an external appearance view representing a configuration of the image reading apparatus 1 with the cover 5 being in an open state. The cover 5 is coupled to the apparatus body 3 via a hinge (not shown).

Also, as shown in FIGS. 1A and 1B, the apparatus body 3 comprises an operation part 15 comprising various switches on its front, and a user operates the operation part 15 and thereby, processing according to a command inputted from the operation part 15 is executed. Further, as shown in FIG. 2, the edge 11a (boundary with frame part 31 described below) of the first reading surface 11 near to a hinge of the cover 5, and the edge 11b (boundary with a positioning material 17 described below) of the side near to the second reading surface 12 collectively form a original reference position, which becomes the reference placement position when a original P is placed on the first reading surface 11 (see FIG. 3).

Figure 3A:
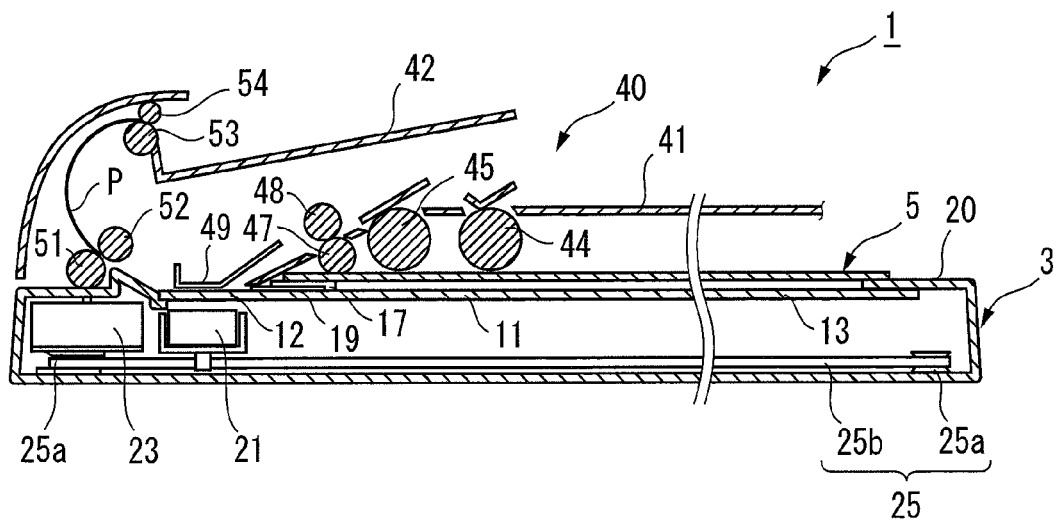
FIGS. 3A and 3B are schematic sectional views representing a cross section along a longitudinal direction of the exemplary embodiment of the image reading apparatus.
Figure 3B:
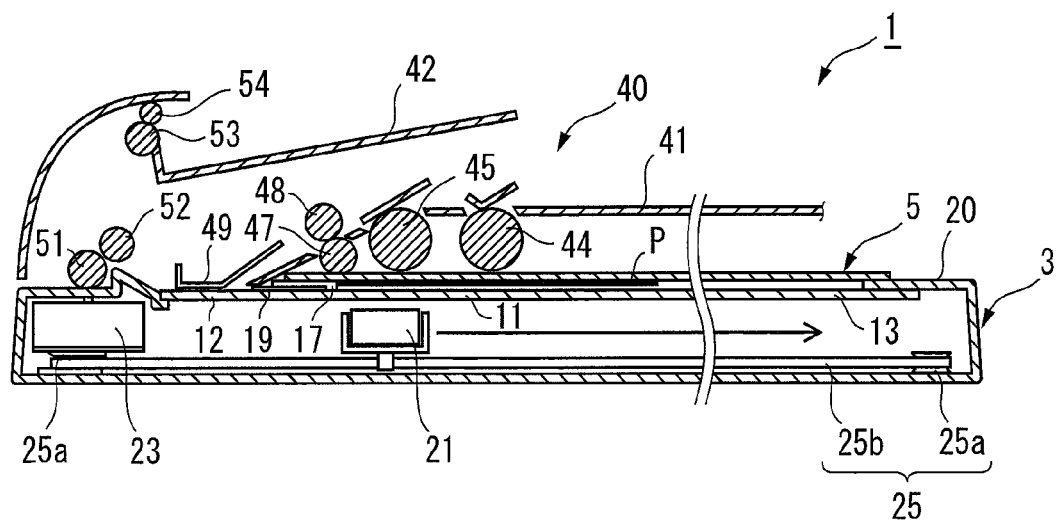

FIGS. 3A and 3B are schematic sectional views representing a cross section along a longitudinal direction of the exemplary embodiment of the image reading apparatus 1. As shown in FIG. 3, the apparatus body 3 forming the image reading apparatus 1 of the embodiment comprises platen glass 13 which forms the first reading surface 11 and the second reading surface 12, a cabinet 20 which supports the platen glass 13, positioning material 17 for positioning a original P placed on the first reading surface 11, a white reference member 19, an image sensor 21 (one example of an image reading head), a belt mechanism part 25 and a motor 23 (one example of moving unit for moving the image sensor 21 as described below).

Figure 2:
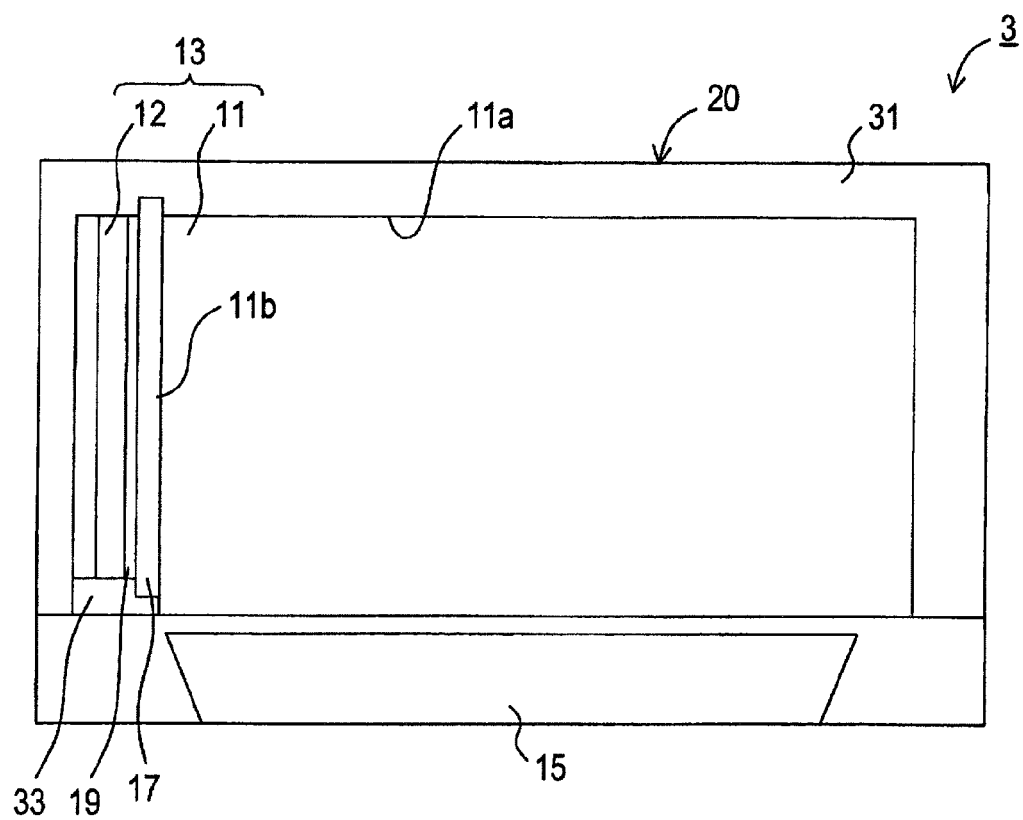
FIG. 2 is a plan view representing an upper configuration of an apparatus body in the exemplary embodiment of the image reading apparatus.

Also, as shown in FIG. 2, the right end (right side in FIG. 2) and the back end (upper side in FIG. 2) of the platen glass 13 are fixed in the cabinet 20 and are pressed from the upper side to the lower side by the frame part 31, which extends from the upper edge of the cabinet 20 toward the center substantially parallel with a bottom surface of the cabinet 20. Also, the front left end of the platen glass 13 is pressed from the upper side to the lower side by a glass fixed part 33, which extends from the edge of the front left end of the frame part 31 and is fixed so as not to peel from the cabinet 20.

Additionally, the surface of the platen glass 13 is divided into the first reading surface 11 and the second reading surface 12 by the positioning material 17, which is detachably connected to the cabinet 20. The first reading surface 11 is a region for reading an original P placed on the surface by a user and is disposed in a right region of the image reading apparatus 1. Conversely, the second reading surface 12 is a region for reading an original P conveyed by a original conveying device 40 disposed in the cover 5 and is disposed in a left region of the image reading apparatus 1.

Also, the image sensor 21 is received movably in right and left directions (a sub-scanning direction) along a back surface (that is, a back surface of the platen glass 13) of the first and second reading surfaces 11, 12 on the inside of the cabinet 20. This image sensor 21 is fixed to a belt 25b wound on a pair of rollers 25a, which form the belt mechanism part 25 comprises, and the image sensor 21 moves in the right and left directions of the image reading apparatus 1 together with the belt 25b rotating by power generated by the motor 23.

Additionally, FIG. 3A is an explanatory diagram representing a fixed position of the image sensor 21 in the case of reading a original P while conveying the original P targeted for reading on the second reading surface 12 using the original conveying device 40 disposed in the cover 5, and FIG. 3(b) is an explanatory diagram showing a scanning form of the image sensor 21 when reading a original P placed on the first reading surface 11.

In the case of reading a original P conveyed on the second reading surface 12 by an action of the original conveying device 40 disposed in the cover 5, the image sensor 21 is moved under the second reading surface 12 and is fixed. When reading a original P placed on the first reading surface 11, the image sensor 21 is moved in the right and left directions along the back surface side of the first reading surface 11 by an action of the belt mechanism part 25 and the motor 23.

The cover 5 comprises the original conveying device 40 as described above and in the following manner, a original P placed on a sheet feeding tray 41 is conveyed along the second reading surface 12 and the original P read by the image sensor 21 on its second reading surface 12 is discharged to a sheet discharging tray 42.

The original conveying device 40 comprises sheet feeding rollers 44, 45 at a starting point of a conveyance path, and a original P placed on the sheet feeding tray 41 is conveyed in the downstream portion of the conveyance path by the sheet feeding rollers 44, 45. The original P conveyed by the sheet feeding rollers 44, 45 is further conveyed in the downstream portion of the conveyance path by conveying rollers 47, 48.

In the downstream side of the conveyance path of the conveying rollers 47, 48, an upper plate 49 is disposed opposite to the second reading surface 12 forms a predetermined air gap with the second reading surface 12. A original P conveyed from the conveying rollers 47, 48 passes between this upper plate 49 and the second reading surface 12 and is conveyed by a pair of conveying rollers 51, 52 disposed further along the downstream portion of the conveyance path from the upper plate 49 and the second reading surface and the original P is subsequently discharged to the sheet discharging tray 42 by a pair of sheet discharging rollers 53, 54.

Figure 4A:
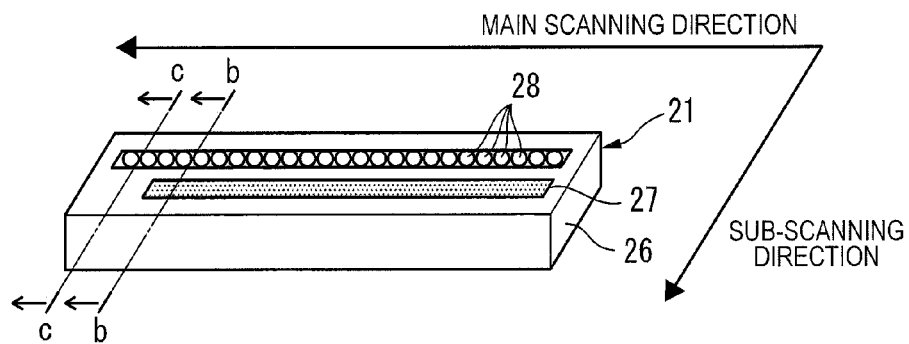
FIG. 4A is a perspective view and FIGS. 4B and 4C are sectional views representing a configuration of an image sensor of an exemplary embodiment of the image reading apparatus.
Figure 4B:
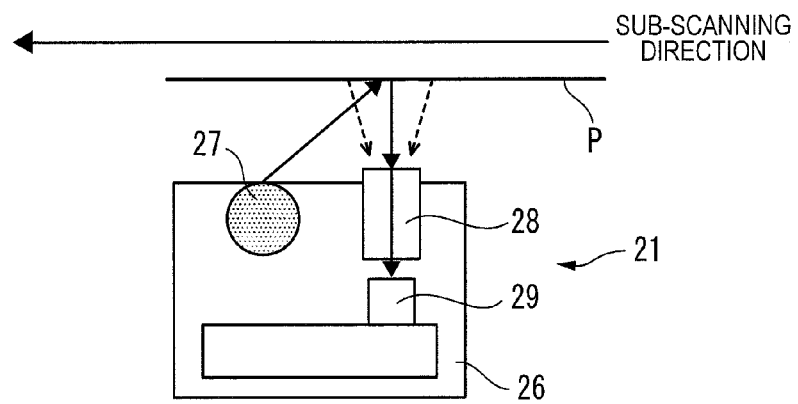
Figure 4C:
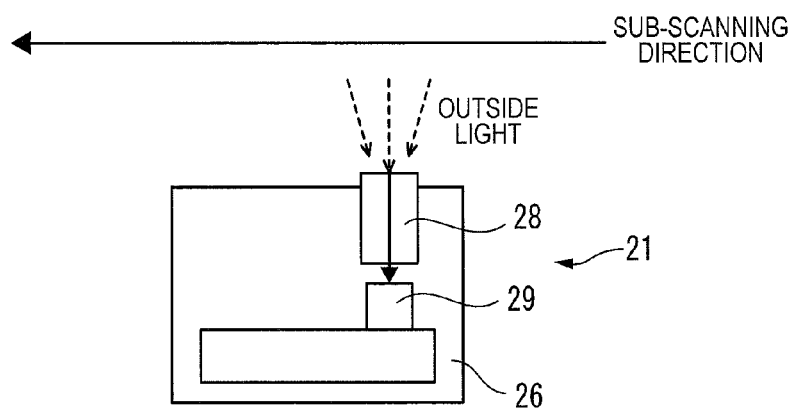

Next, FIG. 4A is a perspective view representing a configuration of the image sensor 21, and FIG. 4B is a sectional view taken on line b-b of FIG. 4(a), and FIG. 4(c) is a sectional view taken on line c-c of FIG. 4(a). As shown in FIG. 4, the image sensor 21 is constructed by disposing a light emitting unit 27 (one example of light emitting unit), a lens 28 and a light receiving element 29 for detecting light collected by the lens 28 in a cabinet 26 (one example of holding unit), which is formed constructed in a rectangular parallelepiped shape extending in the front and back directions (main scanning direction) of the image reading apparatus 1.

Further, the lens 28 and the light receiving element 29 are arranged in a row along the main scanning direction over a length similar to the length in the front and back directions of the platen glass 13 and are disposed in a position which is adjacent to a original P, but the light emitting unit 27 is arranged over to have a length shorter than the length along the main scanning direction of the light receiving elements 29 and the lens 28.

As a result of this configuration, the portion of the light receiving element 29 (one example of reflected light detector) within the length of the light emitting unit 27 detect light reflected by the original P while the original P is irradiated with the light from the light emitting unit 27 as shown in FIG. 4(b). Conversely, as shown in FIG. 4(c), the light reflected by the original P does not enter a light receiving element 29 (one example of outside light detector) which are disposed outside the length of the light emitting unit 27 (i.e. the light receiving element 29 not disposed opposite to the light emitting unit 27). Thus, the light receiving element 29 can detect outside light entering from the outside of the image reading apparatus 1 when the cover 5 is opened. Further, plural (for example, ten) light receiving elements 29 may be disposed outside the length of the light emitting unit 27.

Figure 5:
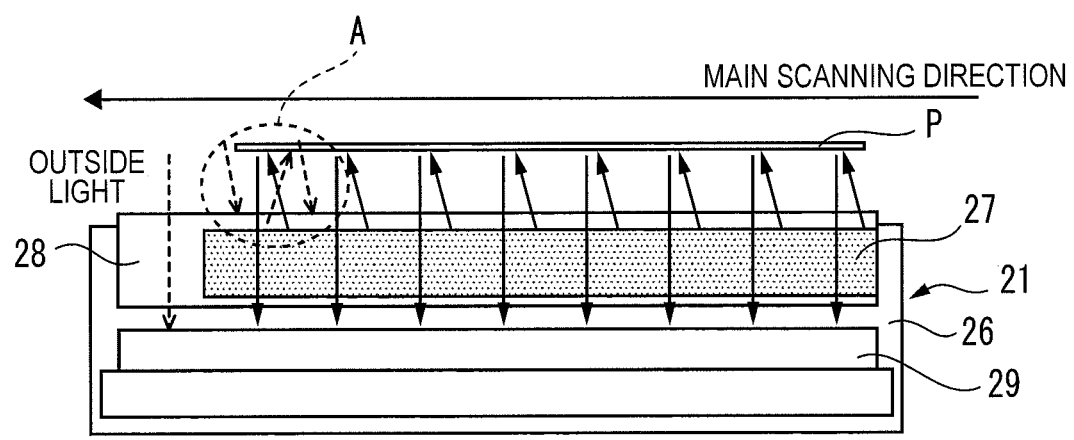
FIG. 5 is an explanatory diagram representing an influence of outside light on an image sensor.

As shown in FIG. 5, the light receiving elements 29 which are not disposed outside the length of light emitting unit 27 are not disposed adjacent to the original P. Further, even for the light receiving element 29 disposed opposite to the original P or the light emitting unit 27, outside light as well as reflected light from the original P enter the light receiving element 29 near the front edge of the original P as shown by a part A shown in FIG. 5. As a result of this, when the detection results of the light receiving element 29, which receives outside light is processed like the detection result of the other light receiving element 29, it is recognized that an image of the original P is brighter by the amount of outside light being received. Therefore, in this embodiment, correction to the outside light can be made by the following control.

Figure 6:
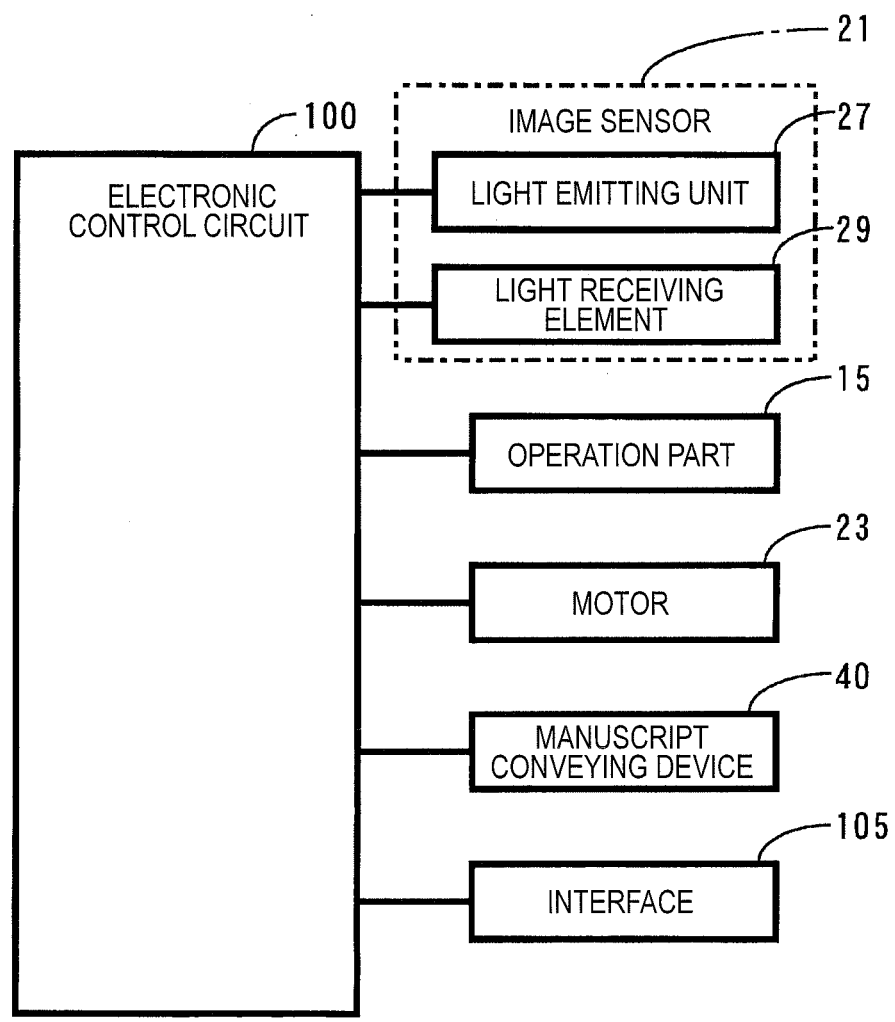
FIG. 6 is a block diagram representing an exemplary embodiment a control system for an image reading apparatus.

FIG. 6 is a block diagram representing a configuration of a control system of the image reading apparatus 1. As shown in FIG. 6, the light receiving element 29 and the light emitting unit 27 of the image sensor 21 are connected to an electronic control circuit 100 made of a microcomputer comprising a CPU, ROM and RAM together with the original conveying device 40, the motor 23 and the operation part 15 described above. Also, an interface 105 for sending read image data to a personal computer (not shown) etc. is connected to the electronic control circuit 100.

Figure 7:
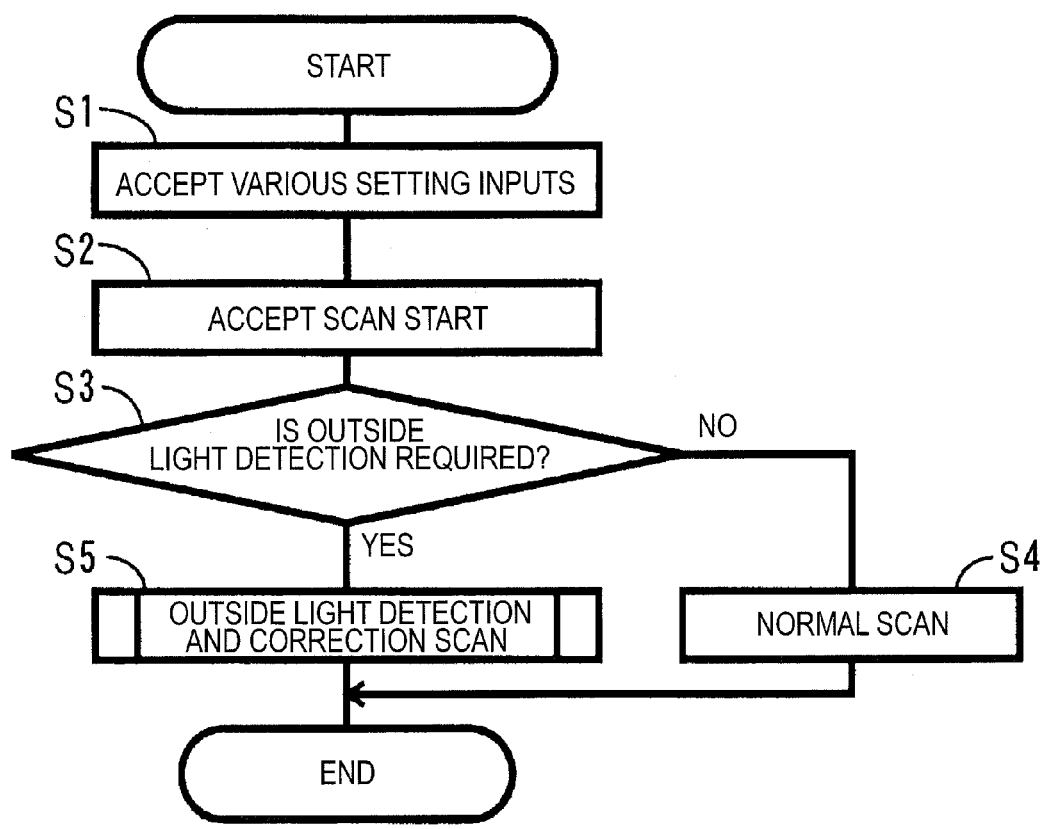
FIG. 7 is a flowchart representing a processing routine of the control system.

Next, processing in the electronic control circuit 100 will be described. FIG. 7 is an explanatory diagram representing a exemplary embodiment of a main processing routine executed by the electronic control circuit 100 based on a program stored in the ROM at the time of activating the image reading apparatus 1.

As shown in FIG. 7, in this process, various setting inputs from the operation part 15 are first accepted in S1 (S as used hereinafter represents a step), and instructions to start a scan received from the operation part 15 are similarly accepted in the S2. Then, when the instructions to start a scan are given, the processing proceeds to S3 during which it is decided whether or not outside light detection is required. For example, when the so-called ADF reading using the original conveying device 40 is instructed in S1, it may be decided in S3 that the outside light detection is not required and when the so-called FB reading during which the image sensor 21 is scanned using the motor 23 is instructed in S1, it is decided in S3 that the outside light detection is required.

Alternatively, it may be decided that the outside light detection is required when a sensor detects the cover 5 is in an opened state and it may be decided that the outside light detection is not required when the sensor detects the cover 5 is in a closed state even when the FB mode is selected if a sensor for detecting the opened and closed states of the cover 5 is provided. Alternatively, it may be decided that the outside light detection is required regardless of the detection result or the presence or absence of a sensor, when a book mode setting instruction is received through the operation part 15 as a form of the FB reading, etc. and is contemplated as a decision form of S3. Further, opening and closing of the cover 5 may be detected by the light receiving element 29 which is disposed outside the length of the light emitting unit 27 or alternatively by a sensor for outside light detection other than the light receiving element. Alternatively, S3 and S4 may be omitted and the outside light detection and correction scan processing (S5) described below may always be executed.

When it is decided that the outside light detection is not required (S3: N), the processing is ended after normal scan processing is executed in S4. Conversely, when it is decided that the outside light detection is required (S3: Y), the following outside light detection and correction scan processing is executed in S5 and the processing is ended after S5.

Figure 8:
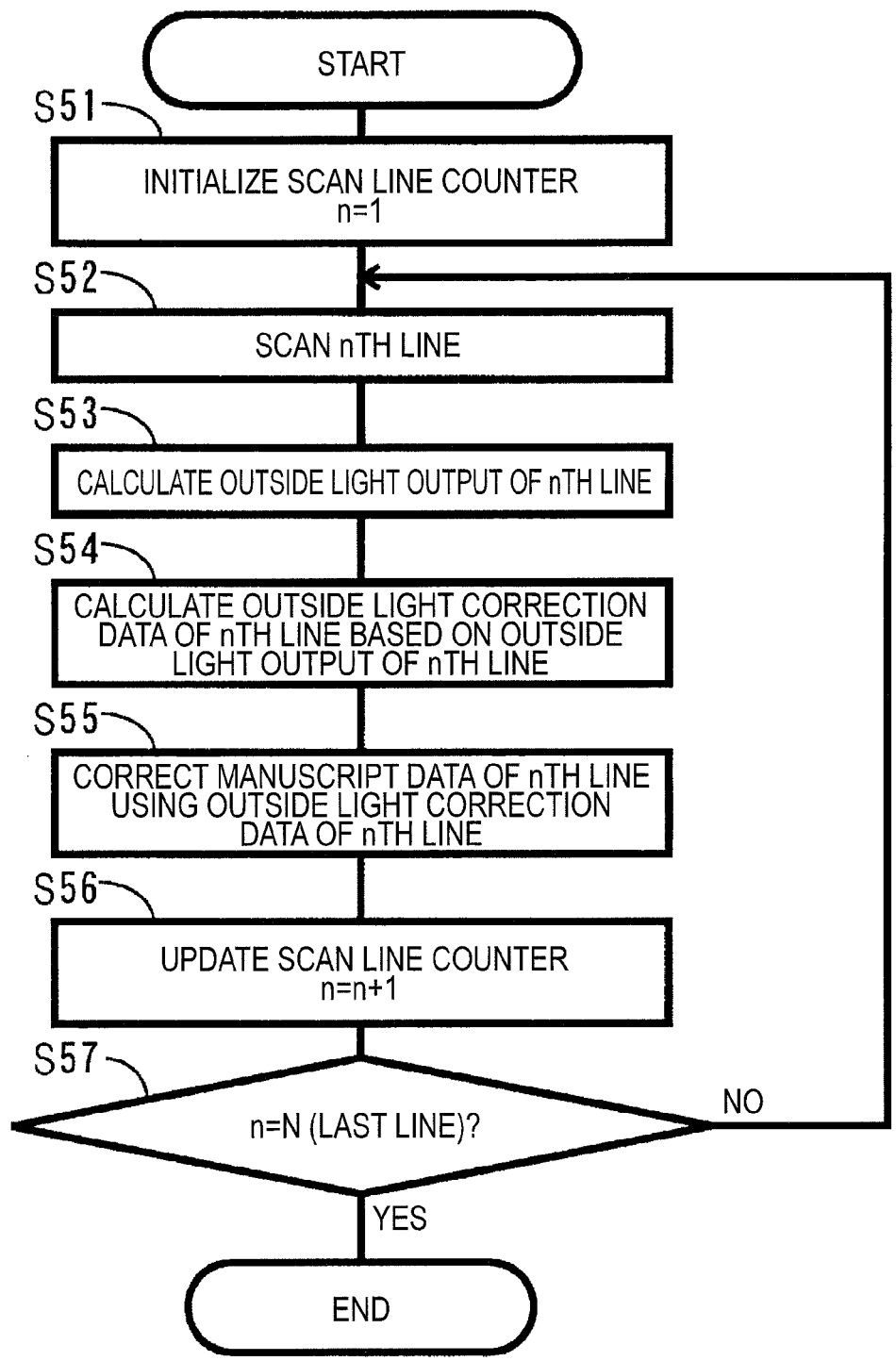
FIG. 8 is a flowchart representing outside light detection and correction scan processing by the control system.

FIG. 8 is a flowchart representing the outside light detection and correction scan processing in detail. Additionally, the light emitting unit 27 is lit up during execution of this routine. As shown in FIG. 8, in this processing, a scan line counter n is initialized to 1 in S51. In S52, a original image of the n-th line (n=1 for the first line at the start of the processing) is scanned by reading a detection result of each of the light receiving elements 29 disposed opposite to the light emitting unit 27. In S53, an average value of detection results of plural light receiving elements 29 which are disposed outside the length of the light emitting unit 27 is calculated as an outside light output. Then, in S54, outside light correction data of the nth line is further calculated shown below based on the average value of light output detection results for the nth line calculated in S53.

Figure 9:
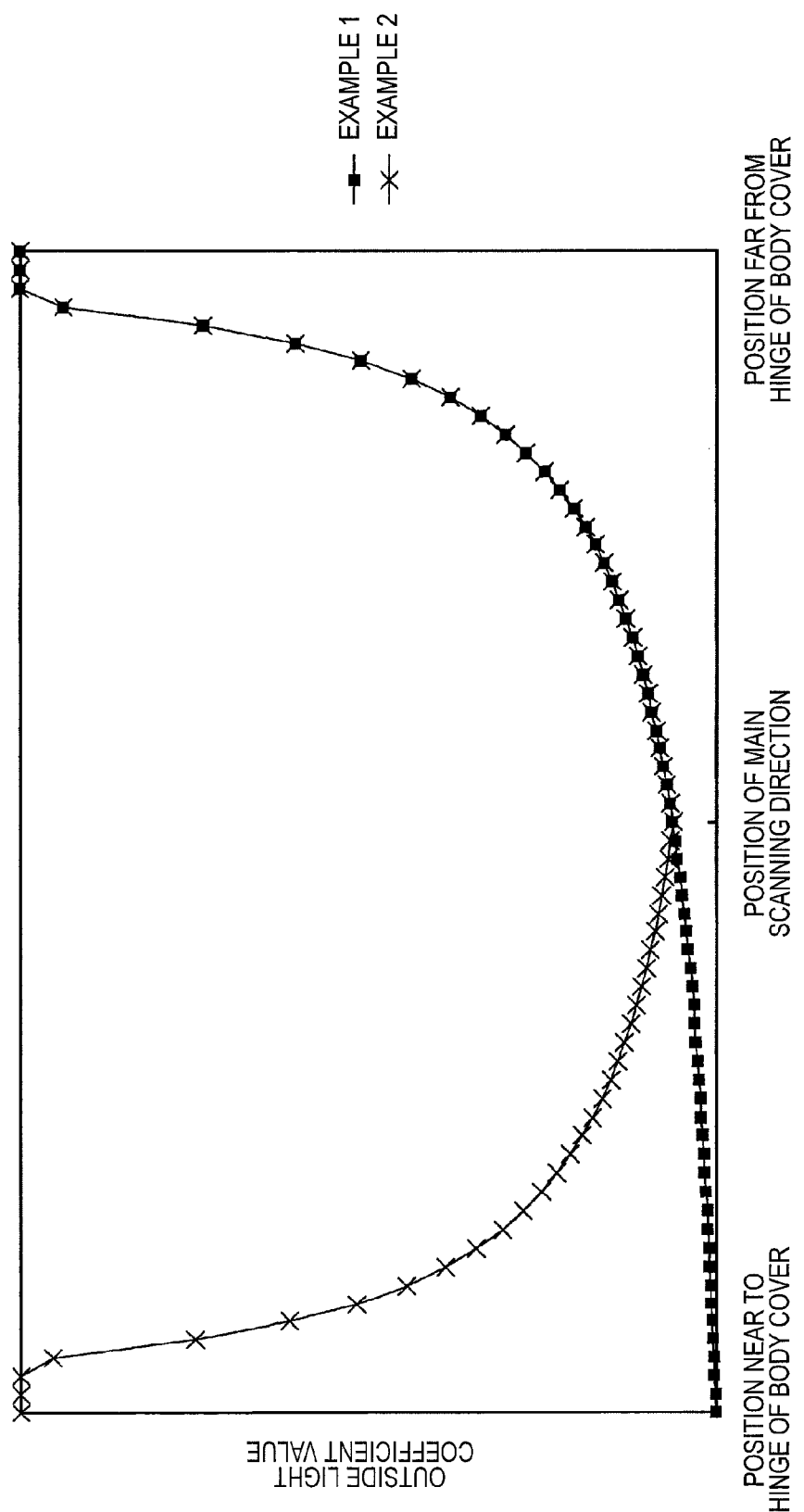
FIG. 9 is an explanatory diagram illustrating an exemplary outside light coefficient value used by the control system during its processing.

Specifically, in S54, a dark outside light output value previously stored in the ROM as an outside light output value for the case where there is no outside light is first subtracted from the outside light output calculated in S53 and its difference is multiplied by, for example, an outside light coefficient value as described in Example 1 or 2 of FIG. 9. Thus, outside light correction data is calculated as shown by using the following formula.

Outside light correction data=(outside light output−outside light dark output)×outside light coefficient value Example 1 of FIG. 9 assumes the case where outside light enters from the side far from a hinge of the cover 5 mainly, and Example 2 assumes the case where outside light enters from the edges of both sides of front and back directions of a original P. Example 1 estimates an influence of outside light becomes small with approach to the hinge of the cover 5 along a main scanning direction, and Example 2 estimates that an influence of outside light becomes small with approach to the center of the original P along the main scanning direction. Use of an outside light coefficient value of either Example 1 or Example 2 may be previously fixed according to characteristics of a model of the image reading apparatus 1 or may be selected based on the justification for deciding that the outside light detection was required in S3 described above. Further, an outside light coefficient value may change to forms other than Examples 1 and 2, or an outside light coefficient value may be set at a fixed value regardless of a position of the main scanning direction used.

When the outside light correction data of the n-th line is calculated in S54, the original image detection result (hereinafter also called original data of the nth line) of the n-th line obtained in S52 is corrected using the outside light correction data of the nth line in the next S55 as shown below.

Figure 10:
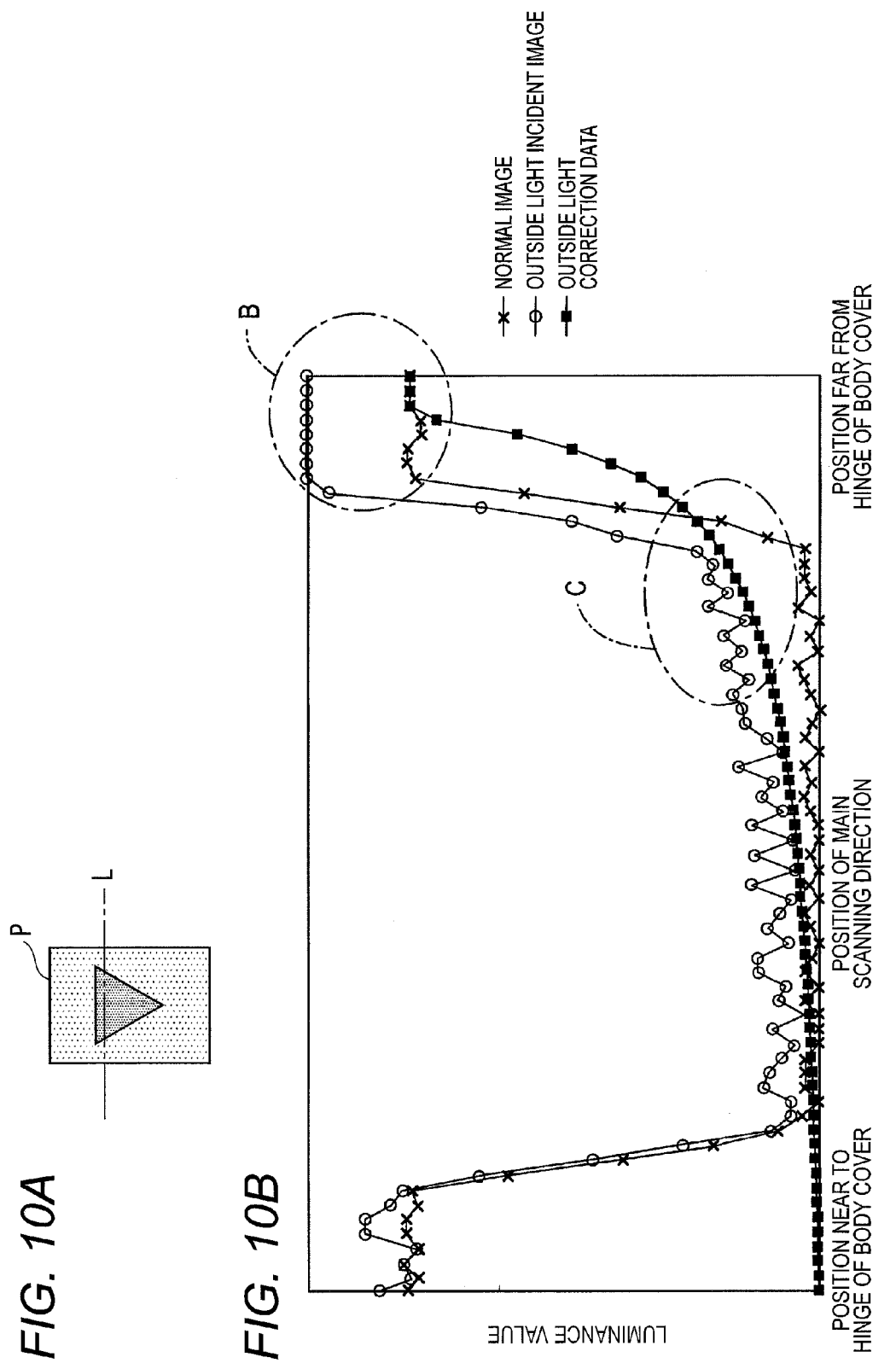
FIGS. 10A and 10B are explanatory diagrams representing an exemplary effect of the control system's processing.

For example, as shown in FIG. 10, when outside light enters while reading a original P along a scanning line L, a luminance value obtained (as represented by x in FIG. 10(b)) normally may be changed (as represented by O). In this example, at a position far from the hinge of the cover 5, a sheet of an intermediate color is recognized as a white color due to the influence of outside light in a region shown by B and a black graphic form is recognized as a gray color in a region shown by C. Therefore, by subtracting the outside light correction data (illustrated by ♦ in FIG. 10) obtained in S54 from the luminance value (O) of original data obtained in S52, the original data can be approximated to a normal image (x) removing the influence of the outside light. Additionally, this processing of S54, S55 corresponds to reflected light correcting unit.

Next in S56, the value of the scan line counter n is incremented by a value of 1 and then in next S57, it is decided whether or not the value of its scan line counter n has reached N corresponding to the last line (scanning line). Then, when the expression n=N is not satisfied (S57: N), the processing proceeds back to S52 and the processing described above is executed with respect to the next line until the expression n=N is satisfied (S57: Y) at which point the processing is ended. Additionally, with respect to original data to which correction for outside light is made in the above manner, shading correction, shading processing (gamma correction etc.), image processing (smoothing and enhancement filter etc.), etc. may also be performed as necessary. The correction for outside light may alternatively be made after the shading correction etc., but when the correction for the outside light is made before the shading correction etc., the processing can be simplified while also improving image quality. Also, the processing described above may be performed by hardware such as an ASIC.

In the embodiment described above, original data detected by the light receiving element 29 disposed opposite to the light emitting unit 27 is corrected according to an outside light output detected by the light receiving element 29 which is disposed outside the length of to the light emitting unit 27, so that the original data can be corrected according to a change in an outside light level in a sub-scanning direction. Thus, the need for a prescan for outside light detection can be eliminated. Moreover, in this embodiment, detection of original data and detection of outside light for correcting its original data are simultaneously performed for every scan line, so that an influence of variations in instantaneous outside light, such as a flicker of a fluorescent lamp etc. can also be corrected for.

Further, in this embodiment, the light receiving element 29 for outside light detection disposed outside the length of the light emitting unit 27 is arranged in a position covered by the cover 5, so that outside light having an influence on reading of a original P can be detected more accurately and thus original data can be better corrected. Moreover, in this embodiment, the light receiving element 29 disposed outside the length of the light emitting unit 27 is disposed further from, in the main scanning direction, the edge 11a (original reference position) of the first reading surface 11 and the hinge of the cover 5 than the light receiving element 29 disposed opposite to the light emitting unit 27. Thus, the light receiving element 29 for outside light detection is arranged in a position susceptible to the influence of outside light and the original data can be better corrected.

Figure 11:
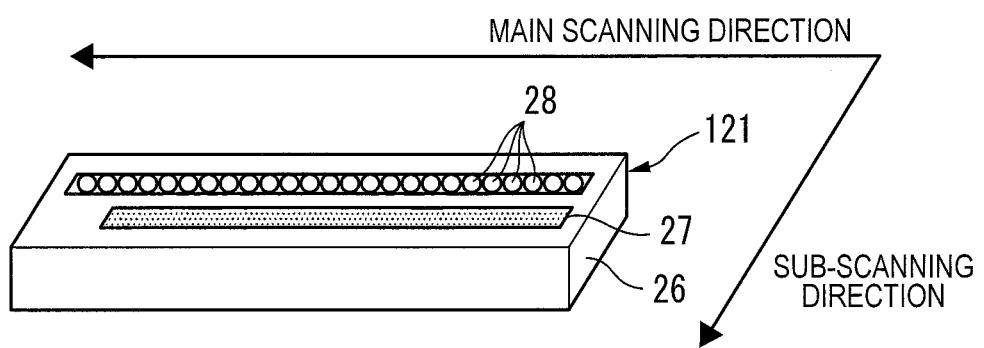
FIG. 11 is a perspective view representing a modified exemplary embodiment of an image sensor.

Additionally, the invention is not limited to the embodiment described above, but can be implemented in various forms without departing from the gist of the invention. For example, like the image sensor 121 shown in FIG. 11, a light receiving element 29 (only a lens 28 is illustrated in FIG. 11) and the lens 28 for outside light detection which are disposed outside the length of the light emitting unit 27 may be disposed on both ends, in the main scanning direction of a light receiving element 29 and a lens 28 for original reading, which are disposed opposite to the light emitting unit 27. In this embodiment, the light receiving elements 29 for outside light detection are arranged on both ends of the main scanning direction outside light can be measured at both ends of the original and the original data can be corrected. Also in this embodiment, it may be desirable to use the outside light coefficient value having a distribution in which the value increases at both ends of a original P as shown in Example 2 of FIG. 9.

Figure 12:
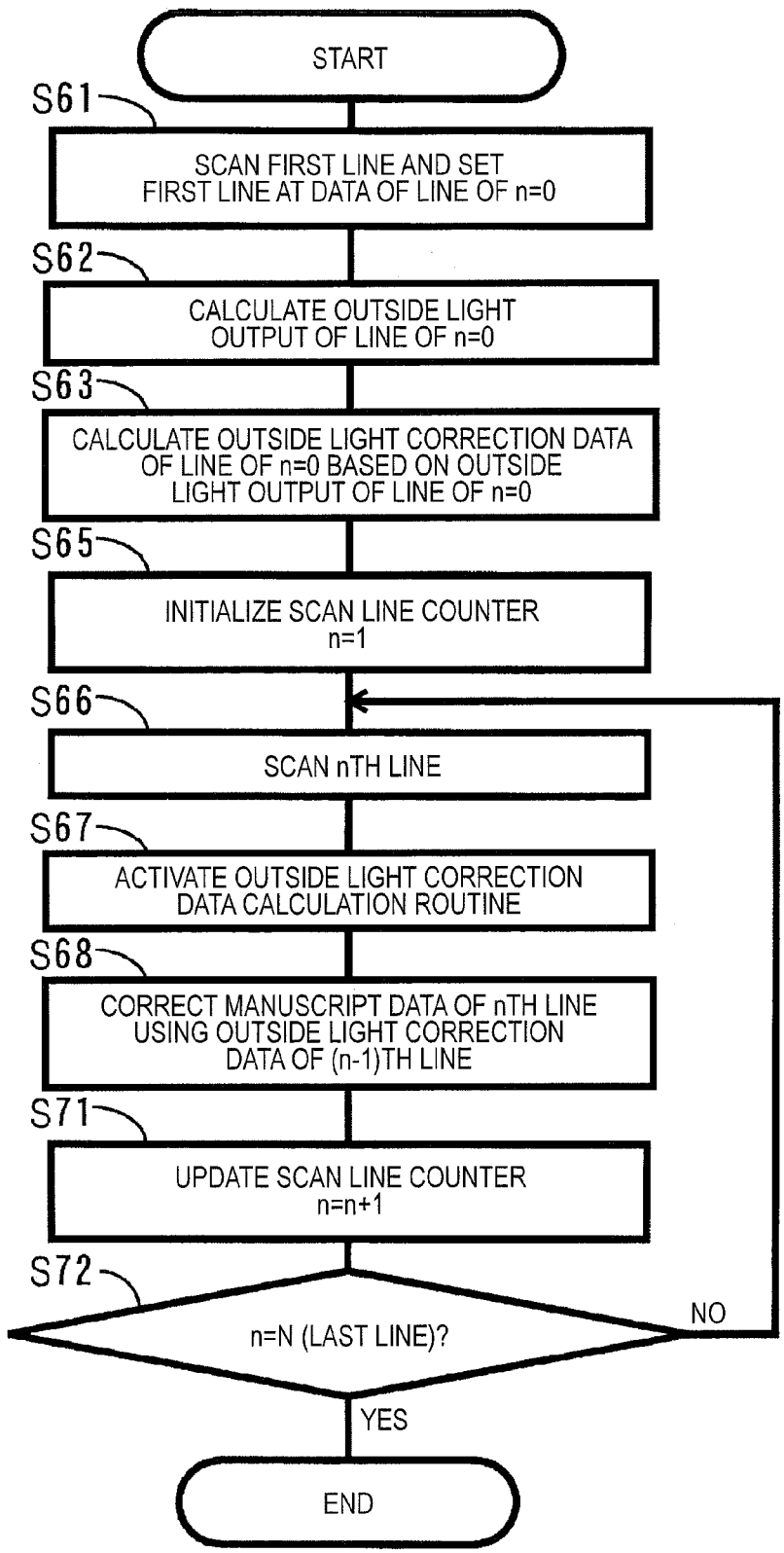
FIG. 12 is a flowchart representing a modified exemplary embodiment of the outside light detection and correction scan processing.

Also, in the above discussed embodiment, a scanning line in which outside light is detected matches with a scanning line in which the original data is corrected based on the outside light detection result. However, both the scanning lines do not necessarily need to match. FIG. 12 is a flowchart representing outside light detection and correction scan processing by correcting original data based on an outside light output detected from a line scanned prior to the currently scanned line.

As shown in FIG. 12, a original image of the first line is first scanned and is set at data of a line of n=0 in S61. In the next S62, an outside light output of the line of n=0 is calculated as is done in S53 and in S63, and the outside light correction data of the line of n=0 is calculated as is done in S54.

Figure 13:
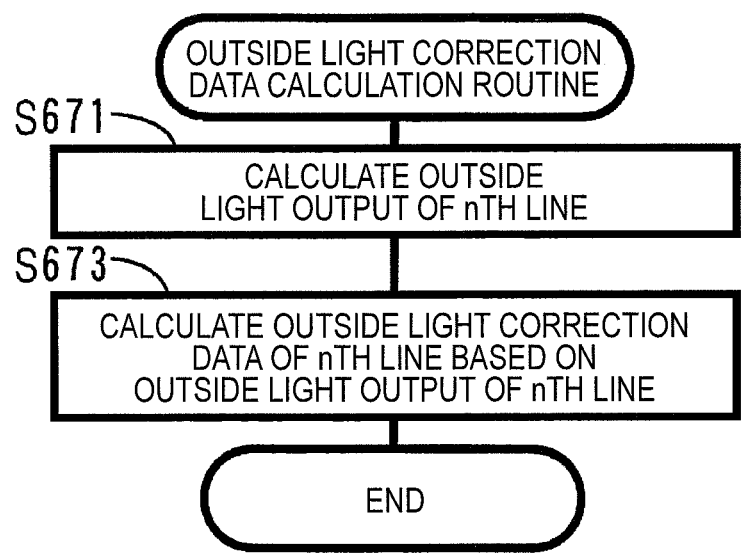
FIG. 13 is a flowchart representing an exemplary embodiment of the outside light correction data calculation routine used in the control system's processing.

Next in S65, a scan line counter n is initialized like in S51 and in S66, and the nth line is scanned like in S52. In S67, an outside light correction data calculation routine shown in FIG. 13 is activated and is executed concurrently with the processing of the S68. As shown in FIG. 13, by S671 and S673, which are similar to S53 and S54, an outside light output of the nth line is calculated (S671) and the outside light correction data of the nth line is calculated based on the outside light output (S673) and then the outside light correction data calculation routine is ended. Conversely in S68, original data of the nth line is corrected using outside light correction data of the (n−1)th line as described above. Normally, the outside light correction data calculation routine is also ended during the processing of S68.

Next in S71, a value of the scan line counter n is incremented by a value of 1 and in S72, it is decided whether or not the value of the scan line counter n has reached Nlast corresponding to the last line (scanning line). When the expression n=Nlast is not satisfied (S72: N), the processing proceeds to S66 and the processing described above is executed with respect to the next line until the expression n=Nlast is satisfied (S72: Y) and the processing ends. In this case, by correcting original data using an outside light output with respect to a near line, it becomes unnecessary to hold the original data for a long time and a memory capacity of RAM necessary for an electronic control circuit 100 can be reduced. Also, correction (S68) of original data and calculation (S671, S673) of outside light correction data are executed concurrently, so that processing can also be performed efficiently.

Figure 14:
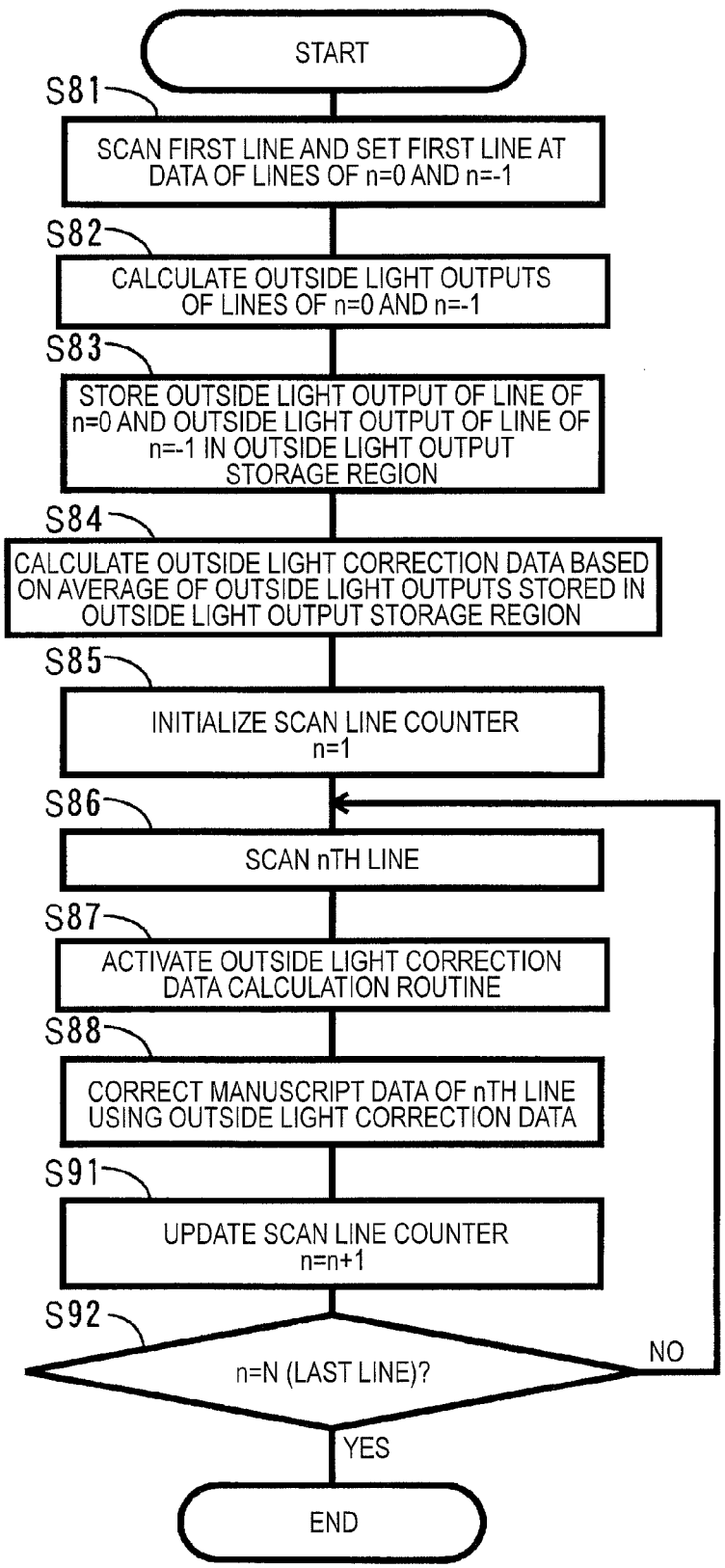
FIG. 14 is a flowchart representing another modified exemplary embodiment of the outside light detection and correction scan processing.

Additionally, in the process of FIG. 12, original data is corrected using an outside light output with respect to a nearby line only off by one line, but original data may be corrected using an outside light output of scanning line separated by a plurality of lines, and as shown in FIG. 14, original data may also be corrected using an average value of outside light outputs from a plurality nearby lines.

As shown in FIG. 14, a original image of the first line is first scanned and is set at data of lines of n=0 and n=−1 in S81. In S82, outside light outputs of the lines of n=0 and n=−1 are calculated as was done in S53 and in S83, the outside light output of line n=0 and the outside light output of line n=−1 are stored in an outside light storage region demarcated in RAM of the electronic control circuit 100. In S84, based on an average of the outside light outputs stored in its outside light storage region, outside light correction data is calculated similar to S54.

Figure 15:
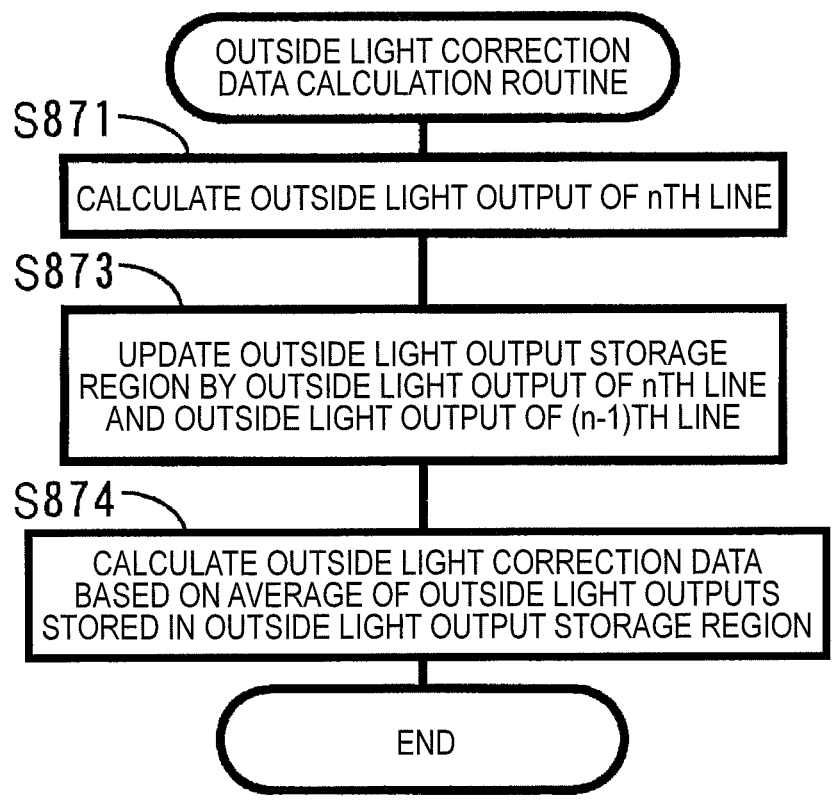
FIG. 15 is a flowchart representing another exemplary embodiment of the outside light correction data calculation routine used in the control system's processing.

In S85, a scan line counter n is initialized similar to S51 and S86, the nth line is scanned like in step S52. In the next step S87, an outside light correction data calculation routine shown in FIG. 15 is activated and is executed concurrently with processing of the S88. As shown in FIG. 15, in this outside light correction data calculation routine, an outside light output of the nth line is calculated in S871, similar to the calculation in S53. In S873, the outside light output of the nth line and an outside light output of the (n−1)th line are replaced with outside light outputs previously stored in the outside light output storage region and are stored, thereby updating the outside light output storage region. Then, in S874, outside light correction data is further calculated based on an average value of the outside light outputs stored in the outside light storage region, similar to S84 and the processing is ended. Conversely, in S88, original data of the nth line is corrected using outside light correction data calculated at that point in time (before a start of the concurrent outside light correction data calculation routine) as described above. Normally, the outside light correction data calculation routine is also ended during the processing of S88.

In S91, a value of the scan line counter n is incremented by a value of 1 and in S92, it is decided whether or not the value of the scan line counter n has reached Nlast corresponding to the last line (scanning line). When n=Nlast is not satisfied (S92: N), the processing proceeds to S86 and the processing described above is executed with respect to the next line until n=Nlast is satisfied (S92: Y) and the processing ends. In this case, by correcting original data using an average value of the outside light outputs with respect to plural lines, an influence of temporary variations in outside light can be eliminated and the original data can be better corrected.

Figure 16:
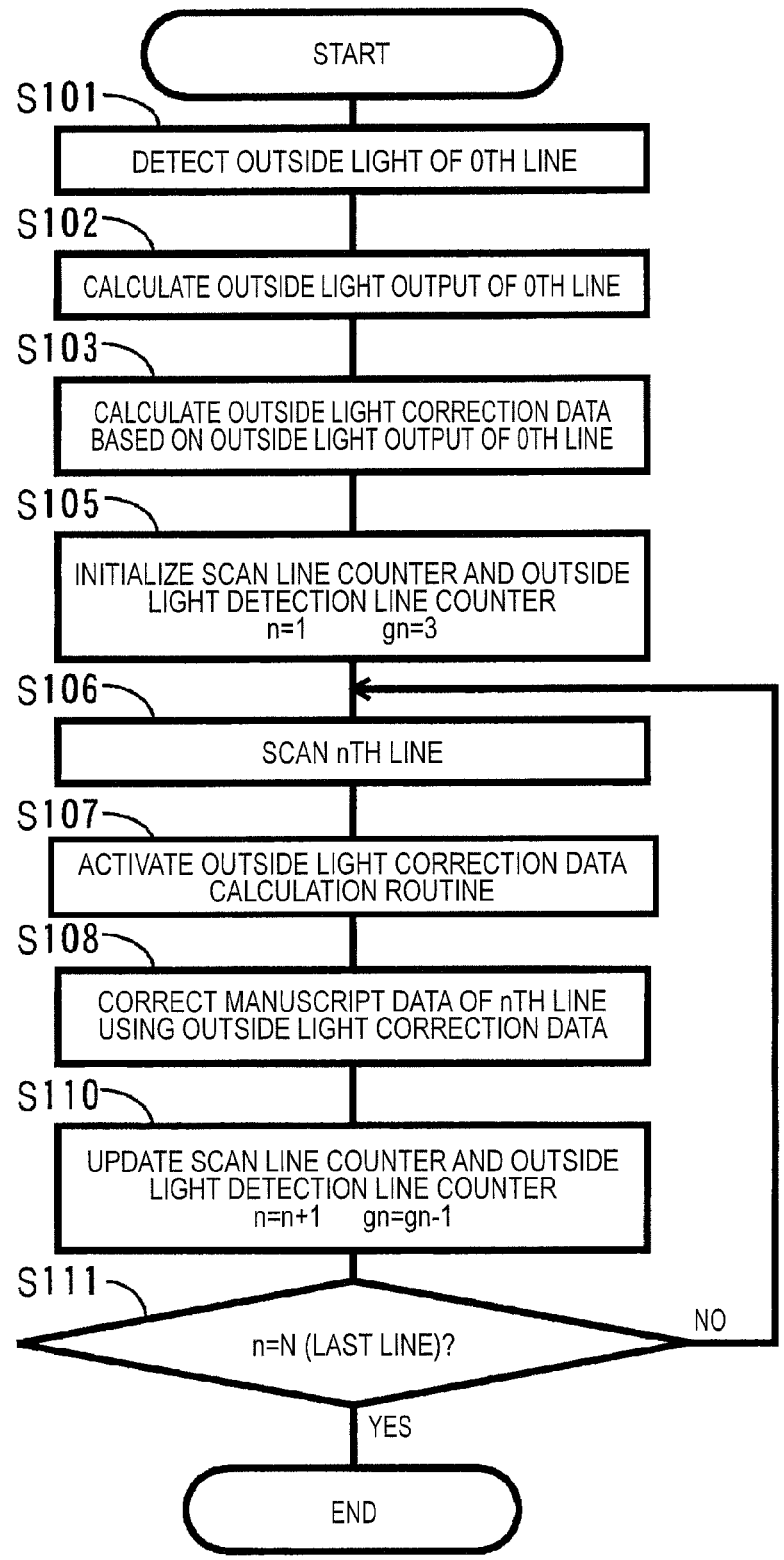
FIG. 16 is a flowchart representing a further modified exemplary embodiment of the outside light detection and correction scan processing.

Also, like the next processing shown in FIG. 16, calculation of an outside light output may be executed every few lines. As shown in FIG. 16, in this processing, outside light of the 0th line is first detected in S101. That is, an output of a light receiving element 29 for outside light detection, which is disposed outside the length of the light emitting unit 27, is read with respect to, for example, the line (0th line) 3 mm from the top of a original, which is skipped during a normal scan. In S102, the outside light output of the 0th line is calculated similar to S53 and in S103, outside light correction data is calculated based on the outside light output of the 0th line, similar to S54.

Figure 17:
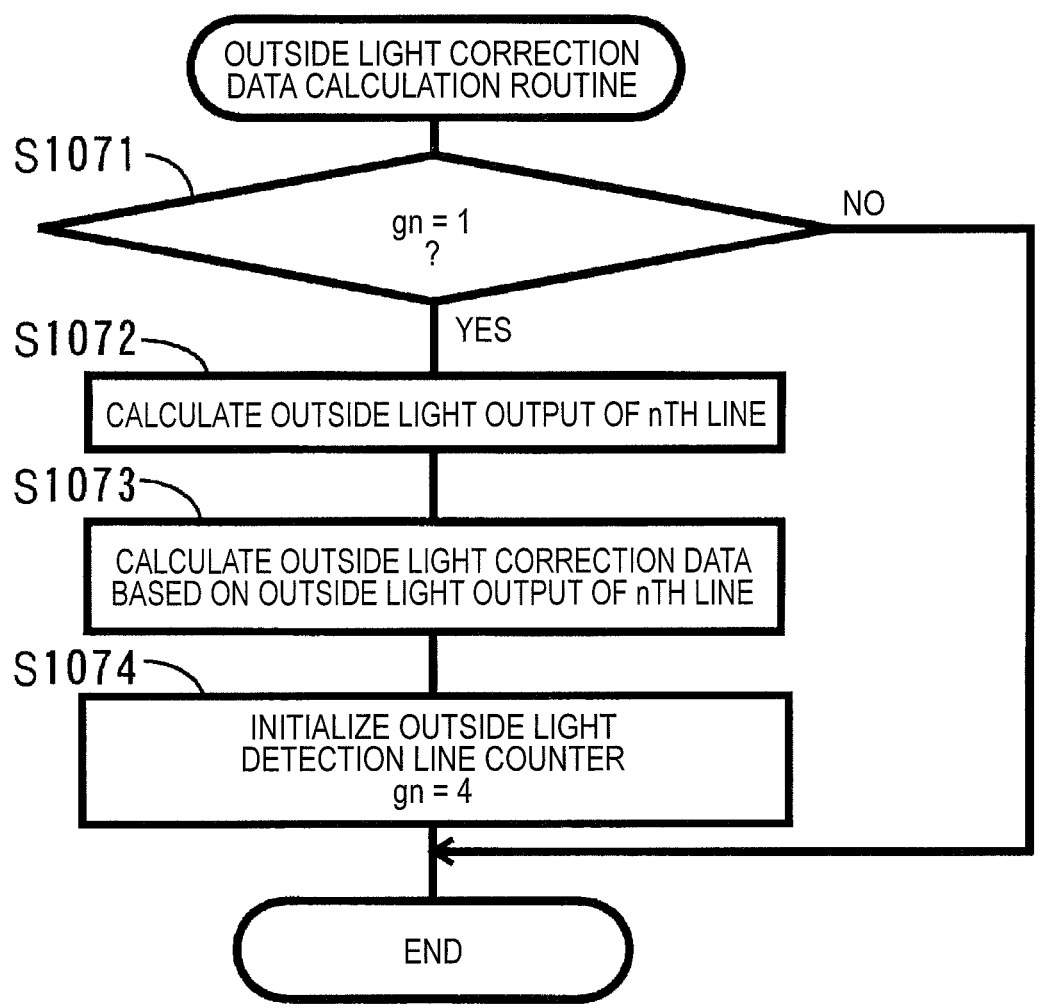
FIG. 17 is a flowchart representing an exemplary embodiment of the outside light correction data calculation routine used in the control system's processing.

In S105, a scan line counter n is initialized to 1 and an outside light detection line counter gn is initialized to 3 and in S106, the nth line is scanned similar to S52. In S107, the outside light correction data calculation routine shown in FIG. 17 is activated and is executed concurrently with the processing of S108. As shown in FIG. 17, during the outside light correction data calculation routine, it is decided whether or not gn=1 is satisfied in S1071. If gn≠1 (S1071: N), the processing is ended as it is. On the other hand, for gn=1 (S1071: Y), by S1072 and S1073, which are similar to S53 and S54 respectively, an outside light output of the nth line is calculated (S1072) and outside light correction data of the nth line is calculated based on its outside light output (S1073). In S1074, the outside light detection line counter gn is initialized to 4 and the processing ends. Additionally, at the time of starting the processing of FIG. 15, gn=3 is satisfied (see S105), so that in this routine, a negative decision is made in S1071 and the processing ends as it is.

Conversely, in S108, original data of the nth line is corrected using outside light correction data calculated at that point in time (before a start of the concurrent outside light correction data calculation routine) as described above. Normally, the outside light correction data calculation routine is also ended during this processing of S108.

In S110, a value of the scan line counter n is updated to a value incremented by 1 and also a value of the outside light detection line counter gn is decremented by the value 1 and in S111, it is decided whether or not the value of the scan line counter n has reached Nlast corresponding to the last line (scanning line). Then, when the expression n=Nlast is not satisfied (S111: N), the processing proceeds to S106 and the processing described above is executed with respect to the next line and when n=Nlast is satisfied (S111: Y), the processing ends.

In this case, the value of the outside light detection line counter gn at the time of the end of S111 cyclically changes to 2→1→3→2→ . . . and outside light correction data is calculated (S1074) every three lines (S1071: Y). As a result, a load of the electronic control circuit 100 can be further reduced. In this embodiment, outside light of the 0th line is detected in S101, but the first line may be scanned and set at data of a line of n=0, like in S61 described above and conversely, outside light of the 0th line may be detected, like in S101, S61, S81 described above.

In each of the above discussed embodiments, the light receiving element 29 and the light emitting unit 27 are integrally moved, but a scan position may instead be changed by moving only any one of the light receiving element 29 and the light emitting unit 27, and a scan position may be changed by moving a mirror etc. However, in each of the embodiments, the light emitting unit 27 (light emitting element), the light receiving element 29 (functioning as the reflected light detector) and the light receiving element 29 (functioning as the outside light detector) also move integrally, so that a configuration of the apparatus can be simplified. Further, the reflected light detector and the outside light detector are constructed by arranging the light receiving elements 29 in a row over a range longer than the light emitting unit 27 along a main scanning direction, so that the configuration of the apparatus can be simplified.

Further, it is unnecessary to always arrange the light receiving element 29, which functions as the outside light detector, and the light receiving element 29, which functions as reflected light detector, in the same row and, for example, the light receiving element 29, which functions as the outside light detector may be arranged so as to detect outside light of the following line from which the light receiving element 29 functioning as a reflected light detector detects reflected light. In this case, the processing shown in FIGS. 12 and 13 can be applied. Further, embodiments of the present the invention can be applied to an image reading head or an image reading apparatus of any type of CIS and CCD, and various means such as LED or CCFL can be applied as light emitting unit.

What is claimed is:

1. An image reading apparatus comprising:
    an original placement surface configured to support an original to be read by an image reading unit;
    the image reading unit comprising:
        a light emitting unit which is arranged along a main scanning direction, the main scanning direction being orthogonal to a sub-scanning direction, the light emitting unit having a first length in the main scanning direction and being configured to irradiate the original placed on the original placement surface with light;
        a light detector arranged along the main scanning direction, the light detector having a second length in the main scanning direction, the second length being longer than the first length, the light detector comprising:
            a reflected light detector which comprises a first plurality of light receiving elements configured to detect light, and is disposed inside the first length of the light emitting unit; and
            an outside light detector which comprises a second plurality of light receiving elements configured to detect light and is disposed outside the first length of the light emitting unit, and
        a reflected light correcting unit which corrects detection result data regarding the light detected by the reflected light detector based on detection result data detected by the outside light detector.

2. The image reading apparatus according to claim 1, further comprising a cover which covers the original placed on the original placement surface,
    wherein the outside light detector is disposed in a region covered by the cover and the outside light detector is disposed in a position which is not exposed to the original.

3. The image reading apparatus according to claim 2, wherein
    the cover is rotatable around a shaft disposed parallel to the sub-scanning direction,
    the original placement surface comprises a original reference position, which provides a reference for the placement position of the original at one end of the main scanning direction, and
    the second plurality of light receiving elements of the outside light detector is arranged further, in the main scanning direction, from at least one of the original reference position and the shaft than the first plurality of light receiving elements of the reflected light detector.

4. The image reading apparatus according to claim 1, wherein second plurality of light receiving elements of the outside light detector is arranged at both ends of a length of the first plurality of light receiving elements of the reflected light detector.

5. The image reading apparatus according to claim 1 further comprising:
    a holding unit which holds the reflected light detector and the outside light detector in a state of being arranged in a row in the main scanning direction, and
    a moving unit which moves the holding unit and a scan position of the original, from which reflected light is received by the reflected light detector, in the sub-scanning direction.

6. The image reading apparatus according to claim 5, wherein the holding unit holds the light emitting unit integrally with the reflected light detector and the outside light detector.

7. The image reading apparatus according to claim 1, wherein
    the reflected light detector detects the light for each of a plurality of scanning lines, arranged parallel to the main scanning direction, and
    the reflected light correcting unit corrects the detection result data regarding the light detected by the reflected light detector with respect to each of the plurality of scan lines based on a detection result data detected by the outside light detector at a time when the reflection detector detects light for the each of the plurality of scan lines.

8. The image reading apparatus according to claim 1, wherein
    the reflected light detector detects the light for each of a plurality of scanning lines arranged parallel to the main scanning direction, and
    the reflected light correcting unit corrects the detection result data regarding the light detected by the reflected light detector with respect to each of the plurality of scanning lines according to a detection result data detected by the outside light detector at a time when the reflected light detector detects light for one of the plurality of scanning lines preceding a scanning line for which the detection result data of the reflected light detector is currently being corrected.

9. The image reading apparatus according to claim 1, wherein
    the reflected light detector detects the light for each of a plurality of scanning lines arranged parallel to the main scanning direction, and
    the reflected light correcting unit corrects a detection result data regarding the light detected by the reflected light detector with respect to each of the plurality of scanning lines according to an average value of detection results detected by the outside light detector at a time when the reflected light detector detects for a plurality of scanning lines preceding a scanning line for which the detection result of the reflected light detector is currently being corrected.

10. An image reading apparatus comprising:
    an original placement surface configured to support an original to be read by an image reading unit;
    the image reading unit including:
        a light emitting unit which includes a plurality of light emitting elements arranged in a main scanning direction, and a light receiving unit which has a length in the main scanning direction longer than that of the light emitting unit and which includes a plurality of first light receiving elements which are arranged along the main scanning direction and are arranged adjacent to the plurality of light emitting elements and at least one second light receiving element which is arranged in alignment with the first light receiving elements and is not arranged adjacent to the plurality of light emitting elements, wherein a line of the first light receiving elements and each of the light emitting elements, respectively are disposed side by side, the at least one second light receiving element being offset from the light emitting unit in the main scanning direction; and a correcting unit which corrects outputs of the first light receiving elements based on an output of the second light receiving element.

11. The image reading apparatus according to claim 10 further comprising a cover which is openably coupled at one side of the original placement surface via a hinge, wherein the at least one second light receiving element is disposed between a hinge and the plurality of first light receiving elements.

12. The image reading apparatus according to claim 10, wherein the correcting unit calculates a correction value based on a luminance value output from the at least one second light receiving element, and corrects the outputs of the plurality of first light receiving elements by subtracting the correction value from luminance values of the plurality of first light receiving elements.

* * * * *